United States Patent
Bevington

(10) Patent No.: US 6,359,353 B1
(45) Date of Patent: Mar. 19, 2002

(54) SUBMERSIBLE MOTOR UNIT

(75) Inventor: Jack T. Bevington, Ashland, OH (US)

(73) Assignee: F. E. Myers division of Pentair Pump Group, St. Paul, MN (US)

(*) Notice: Subject to any disclaimer, the term of this patent is extended or adjusted under 35 U.S.C. 154(b) by 0 days.

(21) Appl. No.: 09/621,094

(22) Filed: Jul. 21, 2000

(51) Int. Cl.[7] .............................. H02K 5/10; H02K 5/22; H02K 11/00
(52) U.S. Cl. .............................. 310/87; 310/43; 310/72; 417/422; 417/423.3
(58) Field of Search .............................. 310/87, 89, 43, 310/71, 72, 91; 417/422, 423.5, 366, 423.8, 406, 410.3, 423.3; 318/195, 786; 439/271

(56) References Cited

U.S. PATENT DOCUMENTS

| | | | | |
|---|---|---|---|---|
| 3,135,884 A | * | 6/1964 | Luenberger | 310/87 |
| 3,604,964 A | * | 9/1971 | Conrad et al. | 310/87 |
| 3,631,275 A | * | 12/1971 | Conrad et al. | 310/87 |
| 3,761,750 A | * | 9/1973 | Green | 310/87 |
| 4,546,300 A | | 10/1985 | Shaikh | 318/786 |
| 4,649,305 A | * | 3/1987 | Morrill | 310/72 |

* cited by examiner

*Primary Examiner*—Tran Nguyen
(74) *Attorney, Agent, or Firm*—Amin & Turocy, LLP

(57) ABSTRACT

A submersible motor unit is used to drive a pump and is submerged with the pump in liquid (water). The motor unit includes a tubular housing member and a tubular inner member which is enclosed by and disposed in a coaxial relationship with the tubular housing member. A stator is disposed in a stator chamber formed between the tubular inner member and the tubular housing member. A rotor is disposed in a rotor chamber disposed within the inner member. End walls close opposite ends of the tubular housing member and the tubular inner member. An annular capacitor is disposed in the stator chamber in an axially spaced apart relationship with the stator. The capacitor extends around the rotor chamber. A body of potting compound is disposed in the stator chamber and at least partially encloses the stator and the capacitor.

5 Claims, 2 Drawing Sheets

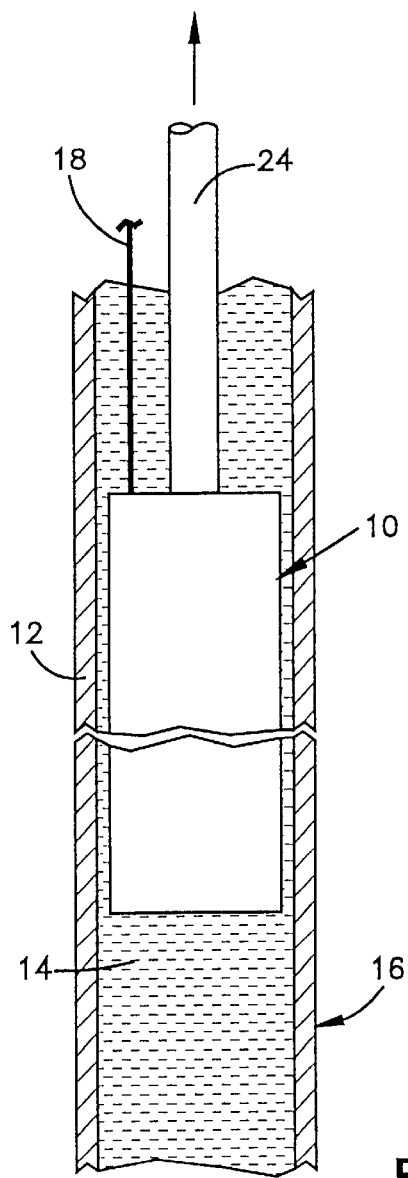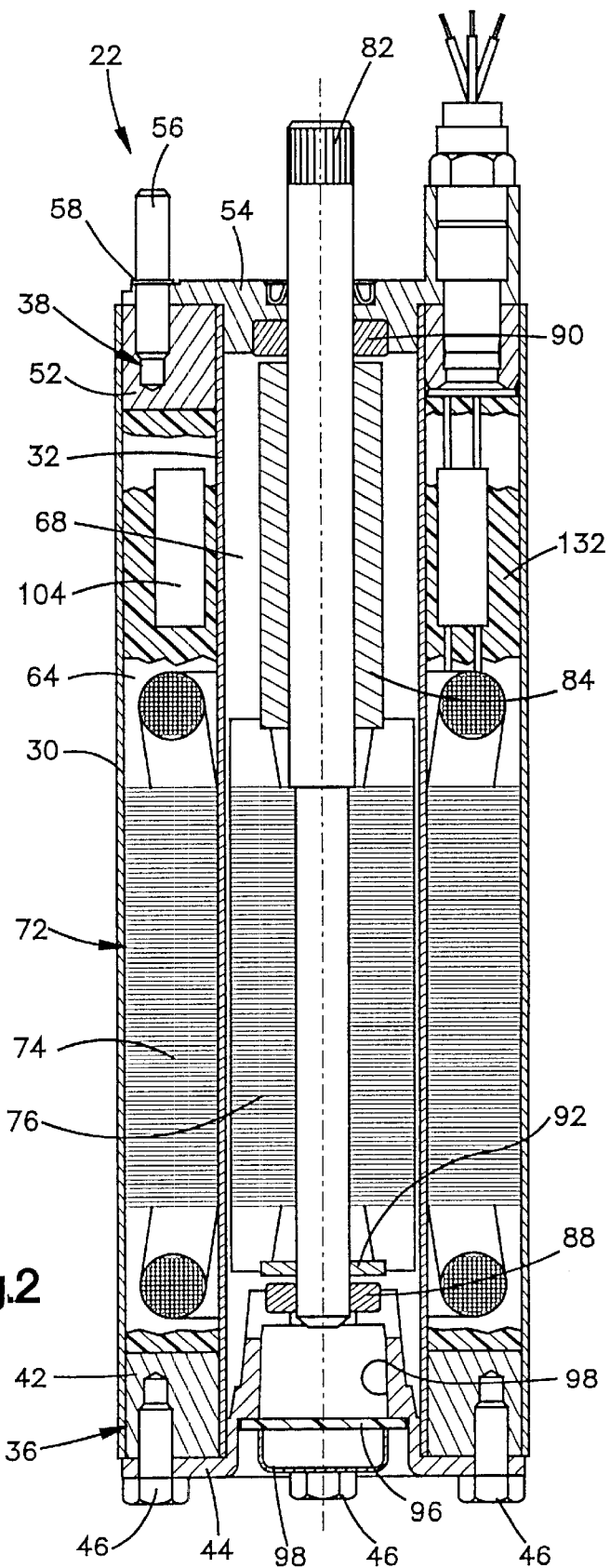

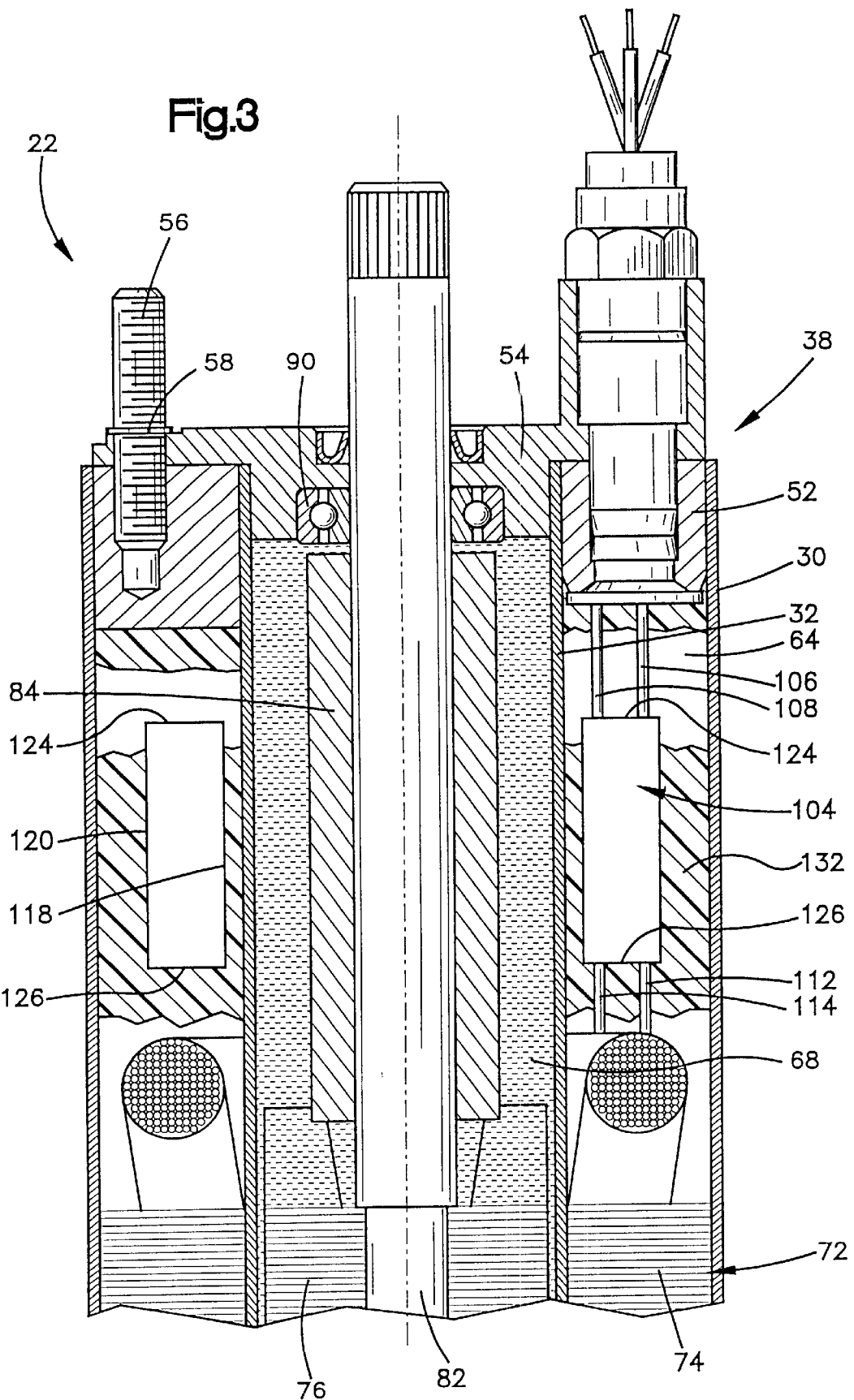

SUBMERSIBLE MOTOR UNIT

BACKGROUND OF THE INVENTION

The present invention relates to a submersible motor unit for use in driving a pump when both the pump and motor unit are submerged in liquid.

A pump and motor unit has previously been submerged in water in a well. During operation of the motor unit to drive the pump, water is pumped from the well. One known pump and motor unit has a relatively large capacitor connected with one end of the unit to store electrical energy for use during starting of the electric motor. The use of a separate housing for the capacitor increases the number of parts required for the pump and motor unit and increases the complexity of the pump and motor unit. A pump and motor unit for pumping water in a well is disclosed in U.S. Pat. No. 4,546,300.

SUMMARY OF THE INVENTION

The present invention relates to a submersible motor unit for use in driving a pump with the pump and motor unit submerged in liquid. The motor unit includes a tubular housing member and a tubular inner member which are disposed in a coaxial relationship. End walls cooperate with the tubular housing member and tubular inner member to form a stator chamber between the tubular housing member and the tubular inner member. In addition, a rotor chamber is formed in the tubular inner member.

A stator is disposed in the stator chamber and extends around a rotor disposed in the rotor chamber. An annular capacitor is also disposed in the stator chamber. The annular capacitor extends around the rotor chamber. A body of potting compound is disposed in the stator chamber and at least partially encloses the stator and the annular capacitor.

BRIEF DESCRIPTION OF THE DRAWINGS

The foregoing and other features of the present invention will become more apparent upon a consideration of the following description taken in connection with the accompanying drawings wherein:

FIG. 1 is a schematic illustration depicting the manner in which a pump and motor assembly may be submerged in water in a well;

FIG. 2 is an enlarge sectional view of a portion of the pump and motor assembly of FIG. 1 and illustrating the construction of a motor unit used in the pump and motor assembly; and FIG. 3 is an enlarged fragmentary sectional view of a portion of FIG. 2 and illustrating the relationship of a capacitor to a stator of the motor unit of FIG. 2.

DESCRIPTION OF ONE SPECIFIC PREFERRED EMBODIMENT OF THE INVENTION

A pump and motor assembly 10 is illustrated schematically in FIG. 1. The pump and motor assembly 10 is disposed in a cylindrical pipe 12 which extends into a body of water 14 in a well 16. Electrical energy is conducted to the pump and motor assembly 10 through a cable 18. During operation of a motor unit 22 (FIG. 2) in the pump and motor assembly 10, a pump unit in the pump and motor assembly is effective to pump water upward from the well 16 (FIG. 1) through a conduit 24.

The motor unit 22 includes a cylindrical tubular housing member 30 (FIGS. 2 and 3). Although the housing member 30 could be formed of many different materials, in the specific embodiment of the invention illustrated in FIG. 2, the housing member is formed of a non-magnetic stainless steel, such as a 300 series stainless steel. A cylindrical tubular inner member 32 is disposed in a coaxial relationship with and is enclosed by the tubular housing member 30. Although the tubular inner member 32 could be formed of many different materials, in the illustrated embodiment of the invention, the tubular inner member 32 is formed of a non-magnetic stainless steel, such as a 300 series stainless steel.

A circular lower or first end wall 36 (FIG. 2) is connected with a lower end of the tubular housing member 30 and a lower end of the tubular inner member 32. Similarly, a circular upper or second end wall 38 is connected with an upper end of the tubular outer member 30 and the tubular inner member 32. The lower and upper end walls 36 and 38 are disposed in a coaxial relationship with each other and with the tubular housing member 30 and tubular inner member 32. Fluid tight connections are formed between the lower and upper end walls 36 and 38 and the tubular housing member 30 and tubular inner member 32.

The lower end wall 36 includes an annular lower end ring 42. The lower end ring 42 is disposed between and sealingly engages lower end portions of the tubular housing member 30 and the tubular inner member 32. The lower end wall 36 also includes a circular lower end cap 44 which is fixedly connected with the lower end ring 42 by suitable fasteners 46. A fluid tight seal is formed between the lower end ring 42 and the lower end cap 44.

If desired, the lower end wall 36 could be integrally formed as one piece. Thus, the lower end ring 42 and lower end cap 44 could be integrally cast as one piece. Although the lower end ring 42 and lower end cap 44 are both formed of metal, they could be formed of a suitable polymeric material if desired.

The upper end wall 38 (FIG. 2) has a construction which is generally similar to the construction of the lower end wall 36. Thus, the upper end wall 38 includes an annular upper end ring 52 which is sealingly connected with upper end portions of the tubular housing member 30 and the tubular inner member 32. The upper end ring 52 is disposed in a coaxial relationship with the lower end ring 42. The annular lower end ring 42 and the annular upper end ring 52 have the same outside diameter and the same inside diameter. An upper end cap 54 is fixedly connected in sealing engagement with the upper end ring 52 by a plurality of threaded studs 56. The studs 56 have a flange 58 which presses the upper end cap 54 firmly against the upper end ring 52. The threaded studs facilitate connection of the motor unit 22 with a pump unit (not shown).

The tubular housing member 30, tubular inner member 32, lower end wall 36, and upper end wall 38 cooperate to form a cylindrical annular outer or stator chamber 64. The tubular inner member 32 cooperates with the lower end wall 36 and upper end wall 38 to form a cylindrical inner or rotor chamber 68. The rotor chamber 68 is disposed in a coaxial relationship with and is circumscribed by the stator chamber 64.

An electric motor 72 (FIG. 2) includes a stator 74 which is disposed in stator chamber 64 and a rotor 76 which is disposed in the rotor chamber 68. The stator 74 extends around and is coaxial with the rotor 76.

A motor output or drive shaft 82 is fixedly connected with the rotor 76 and extends out of the motor unit 22. The rotor and drive shaft 82 are rotatable relative to the stator 74 to drive a pump unit in the pump and motor assembly 10 of FIG. 1 when the electric motor 72 is energized.

A tubular cylindrical spacer member 84 (FIG. 2) encloses a portion of the motor drive shaft 82. The spacer member 84 is disposed between the rotor 76 and the upper end wall 38. The spacer member 84 maintains a desired spacing between the rotor 76 and the upper end wall 38. The spacer member 84 and the motor drive shaft 82 are disposed in a coaxial relationship with the tubular inner member 32 and the tubular housing member 30.

The motor drive shaft 82 is supported by a lower bearing 88 and an upper bearing 90. The lower and upper bearings 88 and 90 are disposed in a coaxial relationship with lower and upper end walls 36 and 38 and with the tubular member 30 and tubular inner member 32. The lower bearing 88 is mounted on the lower end cap 44. A thrust washer 92 is connected with the rotor 76 and supports the rotor against axially downward (as viewed in FIG. 2) movement. The upper bearing 90 is mounted on the upper end cap 54. The spacer 84 is engagable with the upper bearing 90 to limit upper movement of the rotor 76.

In order to minimize any tendency for the motor unit 22 to leak, the rotor chamber 68 is filled with liquid which is maintained at the same pressure as the liquid 14 (FIG. 1) in which the pump and motor assembly 10 is submerged. To enable the pressure of the liquid 14 (water) in which the pump and motor assembly 10 is submerged to be transmitted to the liquid in the rotor chamber 68, a circular flexible diaphragm 96 extends across a circular opening 98 in the lower end cap 44. A screen 98 extends across the diaphragm 96 and allows water to press against the lower (as viewed in FIG. 2) side of the flexible diaphragm.

The pressure of the water against the lower side of the flexible diaphragm 96 is transmitted to the liquid in the rotor chamber 68. In one specific embodiment of the invention, the liquid in the rotor chamber 68 was water containing propylene glycol to prevent freezing. Of course, other liquids could be utilized if desired.

In accordance with one of the features of the present invention, an annular capacitor 104 is disposed in the stator chamber 64 adjacent to the upper (as viewed in FIG. 3) end of the stator 74. The capacitor 104 stores electrical energy which is utilized during starting of the electric motor 72. Thus, the electric motor 72 is of the known permanent split-capacitor type and utilizes energy from the capacitor 104 during starting. The capacitor produces a phase shift to give additional torque. The capacitor circuit remains in the circuit during the normal operation of the motor.

By mounting the capacitor 104 in the stator chamber 64, the overall size of the motor unit 22 and capacitor is reduced. In addition, the number of joints is reduced and construction of the motor unit 22 is facilitated.

The capacitor 104 is connected with a source of electrical energy by leads 106 and 108 (FIG. 3). The S capacitor 104 is connected with the stator 74 by leads 112 and 114.

The capacitor 104 has cylindrical inner and outer side surfaces 118 and 120 which are disposed in a coaxial relationship. The inner and outer side surfaces 118 and 120 are disposed in a coaxial relationship with the tubular housing member 30 and the tubular inner member 32. In addition, the capacitor 104 has annular end surfaces 124 and 126 which are also disposed in a coaxial relationship with the tubular housing member 30 and tubular inner member 32.

In accordance with another feature of the present invention, the stator chamber 64 is filled with potting compound 132. The potting compound 132 fills the stator chamber 64 so that the stator chamber is free of voids. The potting compound 132 prevents leakage of liquid (water) in which the motor unit 22 is submerged into the stator chamber 64. In addition, the potting compound 132 provides support for the tubular housing member 30 and tubular inner member 32 so that they do not deflect or collapse under the influence of fluid pressure.

The potting compound 132 is an epoxy resin. The epoxy resin forming the potting compound 132 has sufficient rigidity to transmit fluid pressure forces between the radially inner side surface of the tubular member 32 and the radially outer side surface of the tubular housing member 30. This results in the motor unit 22 having a relatively strong cylindrical side wall which extends between the lower and upper end walls 36 and 38 (FIG. 2). Of course, throughout a portion of the extent of the electric motor, the tubular housing member 30 and tubular inner member 32 are supported by the annular stator 74 (see FIG. 2).

The capacitor 104 is supported in the stator chamber 64 in a spaced apart and coaxial relationship with the tubular housing member 30 and tubular inner member 32 by the potting compound 132. Thus, there is an annular layer of potting compound 132 between the cylindrical inner side surface 118 of the capacitor 104 and the tubular inner member 32. Similarly, there is an annular layer of potting compound 132 between the cylindrical outer side surface 120 of the capacitor 104 and the tubular housing member 30.

The potting compound 132 completely fills the space between the upper end surface 124 of the capacitor 104 and the upper end wall 38. Similarly, the potting compound 132 fills the space between the annular lower end surface 126 on the capacitor 104 and the stator 74. At least some voids in the stator 74 may also be filled with the potting compound 132. It should be noted that the potting compound 132 also fills the lower (as viewed in FIG. 2) end portion of the stator chamber 64.

In view of the foregoing description, it is apparent that the present invention provides a new and improved submersible motor unit 22 for use in driving a pump with the pump and motor unit submerged in liquid. The motor unit includes a tubular housing member 30 and a tubular inner member 32 which are disposed in a coaxial relationship. End walls 36 and 38 cooperate with the tubular housing member 30 and tubular inner member 32 to form a stator chamber 64 between the tubular housing member and the tubular inner member. In addition, a rotor chamber 68 is formed in the tubular inner member 32.

A stator 74 is disposed in the stator chamber 64 and extends around a rotor 76 disposed in the rotor chamber 68. An annular capacitor 104 is also disposed in the stator chamber 64. The annular capacitor 104 extends around the rotor chamber 68. A body of potting compound 132 is disposed in the stator chamber 64 and at least partially encloses the stator 74 and the annular capacitor 104.

From the above description of the invention, those skilled in the art will perceive improvements, changes and modifications. Such improvements, changes and modifications within the skill of the art are intended to be covered by the appended claims.

What is claimed is:

1. A submersible motor unit for use in driving a pump with the pump submerged in liquid, said motor unit comprising a tubular housing member, a stator at least partially enclosed by said tubular housing member, a tubular inner member at least partially enclosed by said stator, said tubular inner member being disposed in a coaxial relationship with said tubular housing member, a rotor at least partially enclosed by said tubular inner member, a drive shaft connected with said rotor, a first end wall connected with said tubular housing member and said tubular inner member, a first bearing disposed between said first end wall and said drive shaft, a second end wall connected with said tubular housing member and said tubular inner member, a second bearing disposed between said second end wall and said drive shaft, said first and second end walls and said tubular inner member cooperating to at least partially define a rotor chamber in which said rotor is disposed, said rotor being rotatably supported by said first and second bearings for rotation about a central axis of said rotor chamber, said tubular inner member and said tubular housing member cooperating with said first and second end walls to at least partially define a stator chamber in which said stator is disposed, said stator chamber extends around and is located radially outward of said rotor chamber, an annular capacitor disposed in said stator chamber in an axially spaced apart relationship with said stator, said annular capacitor extends around said rotor chamber, and a body of potting compound disposed in said stator chamber and at least partially enclosing said stator and said annular capacitor.

2. A motor unit as set forth in claim 1 wherein said first end wall at least partially defines an opening, a diaphragm is connected with said first end wall and extends across said opening, said diaphragm having an outer side surface which is exposed to the liquid in which the pump and motor unit are submerged and an inner side surface exposed to liquid in said rotor chamber.

3. A motor unit as set forth in claim 1 wherein said annular capacitor has a cylindrical inner surface which is coaxial with and is spaced apart from a cylindrical outer surface of said tubular inner member, said body of potting compound being at least partially disposed between said cylindrical inner surface of said annular capacitor and said cylindrical outer surface of said tubular inner member.

4. A motor unit as set forth in claim 3 wherein said annular capacitor has a cylindrical outer surface which is coaxial with and is spaced apart from a cylindrical inner surface of said tubular housing member, said body of potting compound being at least partially disposed between said cylindrical outer surface of said annular capacitor and said cylindrical inner surface of tubular housing member.

5. A motor unit as set forth in claim 4 wherein said annular capacitor has a first annular end surface which faces toward and is spaced apart from said stator and a second annular end surface which faces toward and is spaced apart from said second end wall, said body of potting compound being at least partially disposed between said first annular end surface of said annular capacitor and said stator, said body of potting compound being at least partially disposed between said second annular end surface of said annular capacitor and said second end wall.

* * * * *